US008515596B2

(12) United States Patent
Hamke et al.

(10) Patent No.: US 8,515,596 B2
(45) Date of Patent: Aug. 20, 2013

(54) INCREMENTAL POSITION-BASED GUIDANCE FOR A UAV

(75) Inventors: Eric E. Hamke, Albuquerque, NM (US); Matthew Trujillo, Albuquerque, NM (US); Philip Brown, Rio Ranche, NM (US)

(73) Assignee: Honeywell International Inc., Morristown, NJ (US)

(*) Notice: Subject to any disclaimer, the term of this patent is extended or adjusted under 35 U.S.C. 154(b) by 1141 days.

(21) Appl. No.: 12/542,873

(22) Filed: Aug. 18, 2009

(65) Prior Publication Data

US 2011/0046817 A1 Feb. 24, 2011

(51) Int. Cl.
*G01C 23/00* (2006.01)
*B64C 3/18* (2006.01)
*B64B 1/02* (2006.01)

(52) U.S. Cl.
USPC .............................. 701/3; 244/76 R; 244/96

(58) Field of Classification Search
None
See application file for complete search history.

(56) References Cited

U.S. PATENT DOCUMENTS

| 5,408,413 | A |   | 4/1995  | Gonser et al. |
| 5,785,281 | A |   | 7/1998  | Peter et al.  |
| 5,797,106 | A |   | 8/1998  | Murray et al. |
| 5,890,441 | A | * | 4/1999  | Swinson et al. ............ 244/12.3 |
| 6,038,497 | A |   | 3/2000  | Nelson, Jr.   |
| 6,122,572 | A | * | 9/2000  | Yavnai ............................ 701/23 |
| 6,507,782 | B1 |  | 1/2003  | Rumbo et al.  |
| 6,856,894 | B1 |  | 2/2005  | Bodin et al.  |
| 7,177,731 | B2 |  | 2/2007  | Sandell et al. |
| 7,228,227 | B2 | * | 6/2007  | Speer ............................ 701/467 |
| 7,286,913 | B2 | * | 10/2007 | Bodin et al. .................... 701/11 |
| 7,330,781 | B2 |  | 2/2008  | Artini et al.  |
| 7,460,029 | B2 |  | 12/2008 | Boorman et al. |
| 2002/0022909 | A1 | * | 2/2002 | Karem ............................ 701/3 |
| 2003/0060973 | A1 |  | 3/2003 | Mathews et al. |
| 2004/0111192 | A1 |  | 6/2004 | Naimer et al. |

(Continued)

FOREIGN PATENT DOCUMENTS

| EP | 1 462 898 A2 | 9/2004  |
| EP | 1 752 849 A1 | 2/2007  |
| EP | 1 995 560 A2 | 11/2008 |
| WO | 96/35982 A1  | 11/1996 |

OTHER PUBLICATIONS

Wen-Lin Guan et al., "Development of Low-Cost Differential Global Positioning System for Remotely Piloted Vehicles", Journal of Aircraft, vol. 36, No. 4, Jul.-Aug. 1999.

(Continued)

*Primary Examiner* — Thomas Black
*Assistant Examiner* — Tyler Paige
(74) *Attorney, Agent, or Firm* — Shumaker & Sieffert, P.A.

(57) ABSTRACT

Disclosed herein is a method and system for flying a ducted-fan aerial vehicle, such as an unmanned aerial vehicle (UAV). The method includes receiving a flight plan comprising a plurality of waypoints and a plurality of path segments connecting the plurality of waypoints in an order of execution. The method further includes determining actual flight instructions for the ducted fan unmanned aerial vehicle based on (i) the received flight plan, (ii) a predetermined set of operating parameters associated with the ducted fan unmanned aerial vehicle, and (iii) an iterative analysis of a plurality of ordered triples. The method further includes sending the actual flight instructions to at least one processor of the ducted fan unmanned aerial vehicle configured to implement one or more portions of the actual flight instructions.

20 Claims, 10 Drawing Sheets

(56) References Cited

U.S. PATENT DOCUMENTS

| | | | |
|---|---|---|---|
| 2004/0193334 A1* | 9/2004 | Carlsson et al. | 701/9 |
| 2005/0251328 A1* | 11/2005 | Merwe et al. | 701/200 |
| 2006/0049304 A1* | 3/2006 | Sanders et al. | 244/23 A |
| 2006/0058928 A1* | 3/2006 | Beard et al. | 701/11 |
| 2007/0078572 A1* | 4/2007 | Deker et al. | 701/3 |
| 2008/0004757 A1 | 1/2008 | Ingram et al. | |
| 2008/0103647 A1 | 5/2008 | Lucas et al. | |
| 2008/0154490 A1 | 6/2008 | Hoofd et al. | |
| 2008/0300739 A1 | 12/2008 | Coulmeau et al. | |
| 2008/0306680 A1 | 12/2008 | Marty et al. | |
| 2008/0316058 A1 | 12/2008 | Chen et al. | |
| 2010/0147993 A1* | 6/2010 | Annati et al. | 244/12.2 |

OTHER PUBLICATIONS

Keith Cameron et al., "Portable Unmanned Aircraft System Concept Investigation", Aug. 1995.

European Search Report from counterpart EP Application No. 10165748.4, mailed Aug. 2, 2012, 3 pages.

European Communication from counterpart EP Application No. 10165748.4, mailed Aug. 14, 2012, 5 pages.

* cited by examiner

INCREMENTAL POSITION-BASED GUIDANCE FOR A UAV

GOVERNMENT RIGHTS

The United States Government may have acquired certain rights in this invention pursuant to Contract No. MDA972-01-9-0018 awarded by the Defense Advanced Research Projects Agency (DARPA).

FIELD

The application involves ducted-fan aerial vehicles, such as an unmanned aerial vehicle (UAV), and in particular, the flight of a ducted-fan aerial vehicle.

BACKGROUND

Ducted-fan aerial vehicles are known for their superior stationary aerodynamic hovering performance, three-dimensional precision position hold, low speed flights, and precision vertical take-off and landing (VTOL) capabilities. As such, ducted-fan aerial vehicles, and in particular, unmanned aerial vehicles (UAVs) implementing ducted-fans, are increasingly being deployed in battlefield scenarios. For instance, typical UAV operations may include reconnaissance and surveillance, navigating for troops and ground vehicles, and non-line-of-sight targeting. Accordingly, a UAV may be configured to detect enemy troops and vehicles in areas where ground forces (or even aerial forces) lack a direct line-of-sight. In effect, UAVs may become "sentinels" for troops as they move into enemy territory.

For operation of a UAV during, for example, a reconnaissance mission, an operator or operators of the UAV need to control the flight of the UAV. Operating a UAV may require extensive training. For example, in order to operate a UAV, it may be beneficial to have extensive experience flying the UAV or similar vehicles. Further, it may be beneficial to understand the flight performance of the UAV, such as its aerodynamic behaviors or other performance characteristics. However, it may not always be possible for an operator or operators of a UAV to have extensive experience flying the UAV or similar vehicles and/or to understand the flight performance of the UAV.

SUMMARY

The present disclosure describes a method for controlling flight of a UAV, a UAV system, and a UAV ground control station. The method includes receiving a flight plan comprising a plurality of waypoints and a plurality of path segments connecting the plurality of waypoints in an order of execution. Each waypoint has a corresponding activity to be performed by a ducted fan unmanned aerial vehicle at the waypoint. The method further includes determining actual flight instructions for the ducted fan unmanned aerial vehicle based on (i) the received flight plan, (ii) a predetermined set of operating parameters associated with the ducted fan unmanned aerial vehicle, and (iii) an iterative analysis of a plurality of ordered triples. Each ordered triple comprises a most recent prior waypoint and its corresponding waypoint activity, a next waypoint and its corresponding waypoint activity, and a waypoint after the next waypoint and its corresponding waypoint activity. Still further, the method includes sending the actual flight instructions to at least one processor of the ducted fan unmanned aerial vehicle configured to implement one or more portions of the actual flight instructions.

A UAV in accordance with an example embodiment comprises a processor configured to receive a flight plan comprising a plurality of waypoints and a plurality of path segments connecting the plurality of waypoints in an order of execution, wherein each waypoint has a corresponding activity to be performed by the ducted fan unmanned aerial vehicle at the waypoint. The processor is also configured to determine actual flight instructions based on (i) the received flight plan, (ii) a predetermined set of operating parameters associated with the ducted fan unmanned aerial vehicle, and (iii) an iterative analysis of a plurality of ordered triples, wherein each ordered triple comprises a most recent prior waypoint and its corresponding waypoint activity, a next waypoint and its corresponding waypoint activity, and a waypoint after the next waypoint and its corresponding waypoint activity. Further, the processor is configured to execute the actual flight instructions.

A ground station in accordance with an example embodiment comprises a processor configured to receive a flight plan comprising a plurality of waypoints and a plurality of path segments connecting the plurality of waypoints in an order of execution, wherein each waypoint has a corresponding activity to be performed by the ducted fan unmanned aerial vehicle at the waypoint. As a method of flight plan construction the processor is also configured to determine actual flight instructions based on (i) the received flight plan, (ii) a predetermined set of operating parameters associated with the ducted fan unmanned aerial vehicle, and (iii) an iterative analysis of a plurality of ordered triples, wherein each ordered triple comprises a most recent prior waypoint and its corresponding waypoint activity, a next waypoint and its corresponding waypoint activity, and a waypoint after the next waypoint and its corresponding waypoint activity. Further, the processor is configured to initiate the transmission of the actual flight plan to the ducted fan unmanned aerial vehicle. In an alternate configuration, the ground station can transit commands to the air vehicle's flight control system.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 9 is an example of the commands transmitted to a flight control system where each command position is updated at a rate the guidance algorithm is evaluated at.

DETAILED DESCRIPTION

In an exemplary embodiment, the ducted-fan aerial vehicle may take the form of a UAV. For example, the ducted-fan aerial vehicle may take the form of a micro air-vehicle (MAV). Alternatively, the ducted-fan aerial vehicle may take the form of an organic air-vehicle (OAV). Currently, the U.S. government has funded development of two classes of OAVs—smaller class I OAVs and larger class II OAVs. It should be understood by one skilled in the art that the example embodiments can extend to class I or class II OAVs, MAVs, as well as other types of OAVs, UAVs, and ducted-fan aerial vehicles.

In an exemplary embodiment, the UAV is in communication with a control station, such as a ground control station. An operator may enter a flight plan at the ground control station, and a guidance control system (which may be located at the ground control station or in the UAV) may calculate actual flight instructions for the UAV. These actual flight instructions may provide instructions for flying a plurality of path segments and, thus, the actual flight instructions may provide for an incremental position-based guidance for the UAV.

In accordance with an embodiment, the operator may enter a flight plan in the form of a simple polyline, and the guidance control system can calculate actual flight instructions based in part on this entered flight plan. The operator entering the flight plan does not need to take UAV performance capabilities and aerodynamic constraints into account. However, the actual flight instructions may take into account UAV performance capabilities and aerodynamic constraints. The determined actual flight instructions preferably result in a safe and effective flight for the UAV that is within the UAV's performance capabilities, even if the received flight plan is not within the UAV's performance capabilities.

In one example embodiment, a method is carried out by a UAV in communication with a ground control station. In other embodiments, the method may be carried out by a ground control station. Further, in other embodiments, the method may be carried out by a UAV in combination with a ground control station or by external entities.

A. An Exemplary UAV and Ground Control Station

Figure 1:
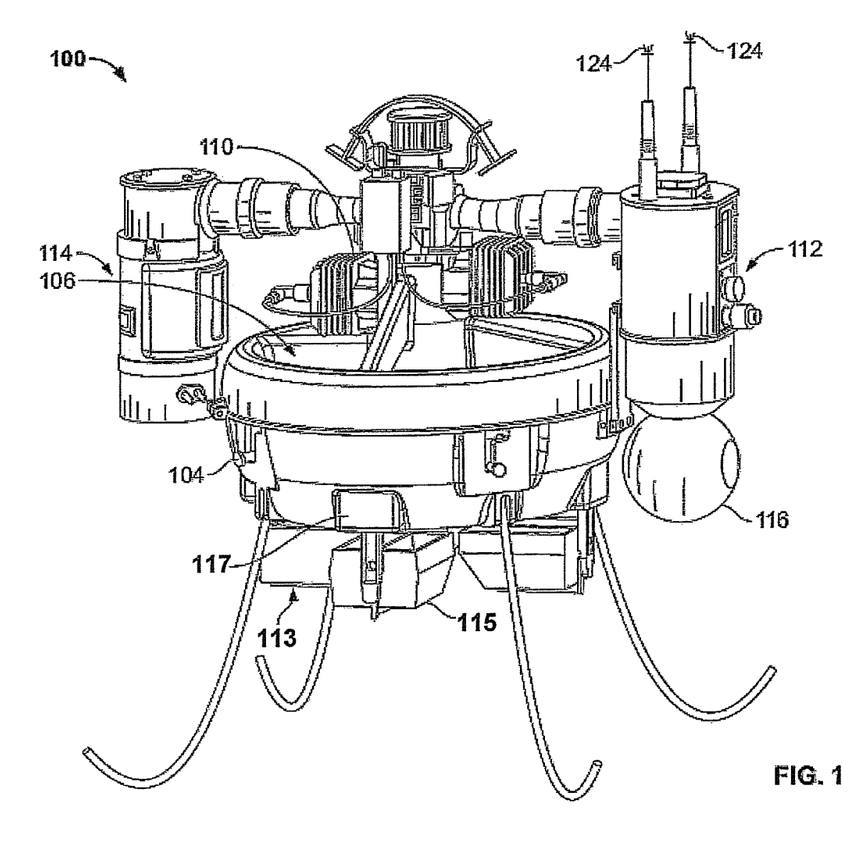
FIG. 1 is a pictorial representation of a UAV, according to an example.

FIG. 1 depicts an example UAV 100. The UAV 100 includes a duct 104 and a fan 106 located within the air duct 104. Additionally, the UAV 100 may have a center body 110. The center body 110 may include components for the operation of UAV 100. For example, the center body 110 may include an engine for powering the UAV 100.

In addition to center body 110, a UAV may also include at least one pod that houses additional components of the UAV. For instance, UAV 100 includes pod 112 and pod 114. Pod 112 may have a camera attached, such as a gimbaled camera 116. The pod 112 may also house other components, such as the camera control system, GPS, a radio, and a video link for imagery, for example.

Pod 114 may include additional UAV components, such as an avionics or navigation system. The avionics system may include a processor. This processor may be any combination of hardware, firmware, and/or software operable to interpret and execute instructions, typically from a software application.

It should be understood that the UAV components located in pods may be arranged in other ways. Further, additional pods or fewer pods are possible. The UAV 100 may also include an antenna or antennas, such as antennas 124. Antennas 124 may allow the UAV to receive and transmit signals, such as navigation signals and imagery signals.

UAV 100 may also include a stator assembly 113 and vanes 115. Stator assembly 113 and vanes 115 may be located under the fan 106 located within the duct 104. Stator assembly 113 may be located just under the fan 106 in the duct 104. Vanes 115 may also be placed under the fan 106, and may operate to create control moments for UAV 100. For instance, the vanes 115 may be placed slightly below an exit section 117 of the air duct 104. UAV 100 may contain fixed and/or movable vanes. Once the vehicle has launched, control vanes 115 receive signals to control the direction of flight. Control vanes move in response to the signals, altering the course of airflow from the fan 106 which guides the direction of flight for the vehicle.

UAV 100 may be used for reconnaissance, surveillance and target acquisition (RSTA) missions, as well as other types of missions. For example, UAV 100 may launch and execute an RSTA mission by flying to a plurality of waypoints according to a flight plan before arriving at a landing position. Once launched, UAV 100 can perform such a UAV flight plan autonomously or with varying degrees of remote operator guidance from one or more remote control stations, such as ground control stations. In accordance with embodiments, a guidance system calculates actual flight instructions based on a flight plan or adjusted flight plan entered by an operator at the ground control station.

Figure 2:
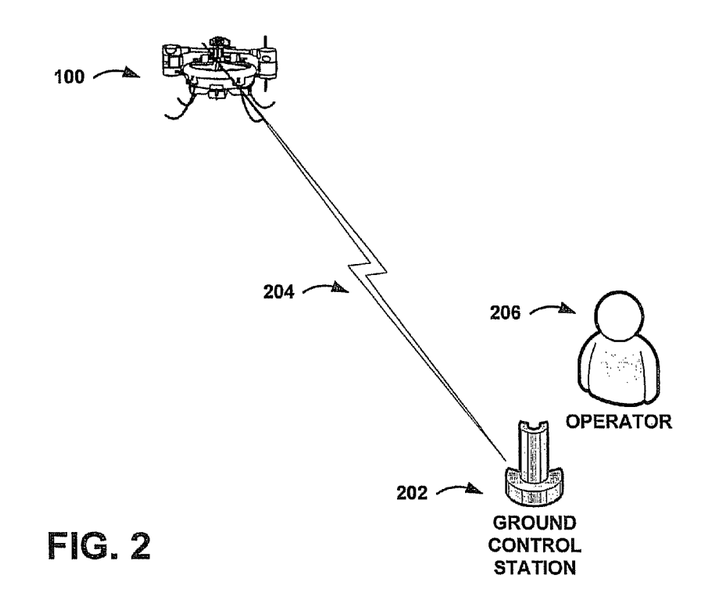
FIG. 2 depicts a UAV in flight and in communication with a ground control station, according to an example.

FIG. 2 depicts UAV 100 in flight, communicating with a control station, such as ground control station 202, via wireless air interface 204. Ground control station 202 may be used by a human user, such as operator 206. Ground control station 202 may be a fixed or mobile ground-based system. In alternative embodiments, the control station 202 could be another remote control station, such as an air-based control system. Ground control station 202 may facilitate the control and monitoring of UAV 100. For instance, ground control station 202 may transmit command and control information (e.g., a flight plan and/or actual flight instructions) to UAV 100 over wireless air interface 204. This command and control information may direct the flight of UAV 100. Furthermore, UAV 100 may transmit multimedia information (e.g., audio and/or video) to ground control station 202. Based on the multimedia information, operator 206 may use ground control station 202 to modify or control the flight of UAV 100. Via wireless air interface 204, operator 206 may have various levels of control over the operation of UAV 100.

Wireless air interface 204 may operate according to various types of wireless technologies, including orthogonal frequency division multiplexing (OFDM), frequency hopping, code division multiple access (CDMA), or any other wireless technology. Preferably, wireless air interface 204 provides one or more bi-directional physical and/or logical channels between UAV 100 and ground control station 202, so that UAV 100 can transmit information to ground control station 202, and ground control station 202 can transmit information to UAV 100.

It should be understood that one UAV may communicate with multiple ground control stations over a wireless air interface. As such, a UAV may be handed off from one ground control station to another, or may communicate simultaneously with multiple ground control stations. Similarly, one ground control station may communicate with multiple UAVs over a wireless air interface. Furthermore, a single wireless air interface may support communications between multiple UAVs and ground control stations.

Figure 3:
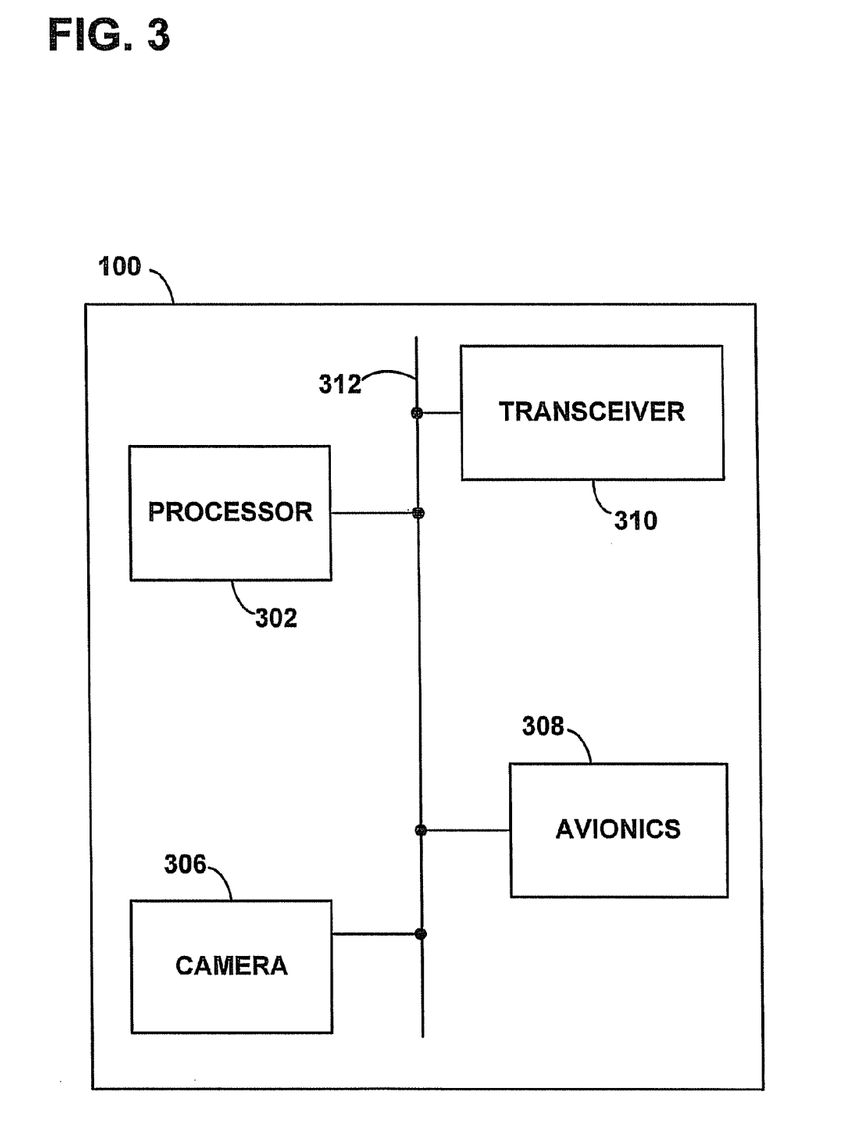
FIG. 3 depicts a UAV configuration, according to an example.

FIG. 3 is a block diagram illustrating at least some of the functional components of UAV 100. In particular, UAV 100 may include a processor unit 302, a camera unit 306, an avionics unit 308, and a transceiver unit 310, all of which may be coupled by a system bus 312 or a similar mechanism. It should be understood that the embodiments of UAV 100 discussed herein may have more or fewer components than shown in FIG. 3, and these components may be logically or physically combined with one another in various combinations.

Processor unit 302 preferably includes one or more central processing units (CPUs), such as one or more general purpose processors and/or one or more dedicated processors (e.g., application specific integrated circuits (ASICs), field programmable gate arrays (FPGAs), or digital signal processors (DSPs), etc.) Processor unit 302 may have access to volatile and/or non-volatile memory that can be integrated in whole or in part with processor unit 302. Such memory preferably holds program instructions executable by processor unit 302, and data that is manipulated by these instructions to carry out various logic functions described herein. (Alternatively, the logic functions can be defined by hardware, firmware, and/or any combination of hardware, firmware, and software.)

UAV 100 may additionally comprise avionics unit 308, which may control the flight of UAV 100. To this end, avionics unit 308 may be capable of receiving signals on system bus 312 that influence various aspects of UAV flight, including but not limited to speed, direction, and altitude. For instance, avionics unit 308 may be able execute actual flight instructions that instruct UAV 100 to fly at a given speed, direction, and altitude until it reaches predetermined coordinates. Then avionics unit 308 may be able to have UAV 100 hover at those coordinates while camera unit 306 streams live audio and/or video of the terrain or objects at those coordinates.

Generally speaking, UAV 100 may be programmed with actual flight instructions that instruct avionics unit 308 to fly UAV 100 between a number of waypoints in a particular order. Avionics unit 308 may accomplish flying along a flight plan autonomously, or in conjunction with other components in FIG. 3, such as processor 302. These actual flight instructions may be actual flight instructions originated from UAV 100 or ground control station 202. Calculation of actual flight instructions will be discussed in greater detail below.

Moreover, UAV 100 may comprise transceiver unit 310, for communicating with ground control station 202. Transceiver unit 310 preferably includes one or more wireless radios for communicating on wireless air interface 204. Additionally, transceiver unit 310 may be capable of transmitting and receiving command and control information in order to exchange this information with ground control station 202. Transceiver unit 310 also may be capable of transmitting and receiving additional information, in order to exchange this information with ground control station 202. Herein, the term "additional information" includes any type of information, other than command and control information, that may be exchanged between a UAV and a ground control station. Examples of additional information may include, but is not limited to, operations logs, software images, and configuration data.

All UAV units depicted by FIG. 3, or not shown in FIG. 3, may be commercial-off-the-self (COTS) components. Alternatively, some or all of these units may be custom or proprietary components.

Figure 4:
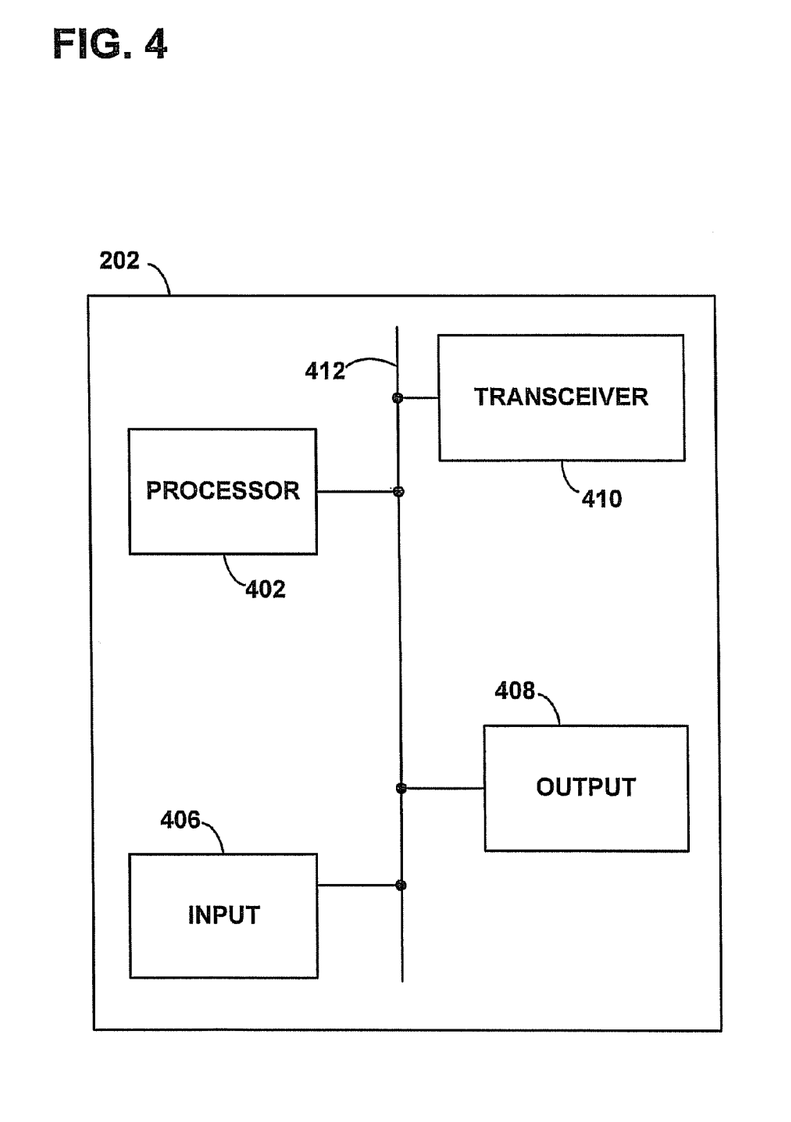
FIG. 4 depicts a ground control station configuration, according to an example.

FIG. 4 is a block diagram illustrating at least some of the functional components of ground control station 202. In particular, ground control station 202 may include a processor unit 402, an input unit 406, an output unit 408, and a transceiver unit 410, all of which may be coupled by a system bus 412 or a similar mechanism. It should be understood that the embodiments of ground control station 202 discussed herein may have more or fewer components than shown in FIG. 4, and these components may be logically or physically combined with one another in various combinations. For instance, in some embodiments, input unit 406 may be combined with output unit 408.

Similar to the processor unit of UAV 100, processor unit 402 preferably includes one or more central processing units (CPUs), such as one or more general purpose processors and/or one or more dedicated processors (e.g., application specific integrated circuits (ASICs), field programmable gate arrays (FPGAs), or digital signal processors (DSPs), etc.) Processor unit 402 may have access to volatile and/or non-volatile memory that can be integrated in whole or in part with processor unit 402. Such memory preferably holds program instructions executable by processor unit 402, and data that is manipulated by these instructions to carry out various logic functions described herein. (Alternatively, the logic functions can be defined by hardware, firmware, and/or any combination of hardware, firmware, and software.)

Ground control station 202 may also comprise input unit 406, to facilitate user interaction with ground control station 202. Input unit 406 may comprise multiple types of input devices, such as a keyboard, a joystick, a mouse, a touch screen, a microphone, and so on. Additionally or alternatively, ground control station 202 may support remote access from another device, via transceiver unit 410 or via another interface (not shown), such an RS-232 port. Preferably, input unit 406 is capable of allowing operator 206 to enter command and control information, such as a flight plan, as well as additional information. This information may then be manipulated by processor unit 402 in accordance with exemplary embodiments and/or sent to transceiver unit 410 for transmission to a UAV.

Ground control station 202 may additionally comprise output unit 408. Output unit 408 may comprise may comprise multiple types of output devices, such as a monitor, printer, or one or more light emitting diodes (LEDs). Output unit 408 may display video captured by a UAV and transmitted by the UAV to ground control station 202. Output unit 408 may also display other information associated with a UAV, such as telemetry, health and diagnostics, and/or navigational data.

Moreover, ground control station 202 may comprise transceiver unit 410, for communicating with one or more UAVs. Like transceiver unit 310 onboard a UAV, transceiver unit 410 preferably includes one or more wireless radios for communicating on wireless air interface 204. Additionally, transceiver unit 410 may be capable of transmitting and receiving command and control information, in order to exchange this information with ground control station 202. Transceiver unit 410 may be capable of transmitting and receiving additional information, also in order to exchange this information with a UAV.

Similar to the UAV units, all remote control station units depicted by FIG. 4, or not shown in FIG. 4, may be COTS components. Alternatively, some or all of these units may be custom or proprietary components.

B. An Exemplary Method for Controlling Flight of the UAV

Figure 5:
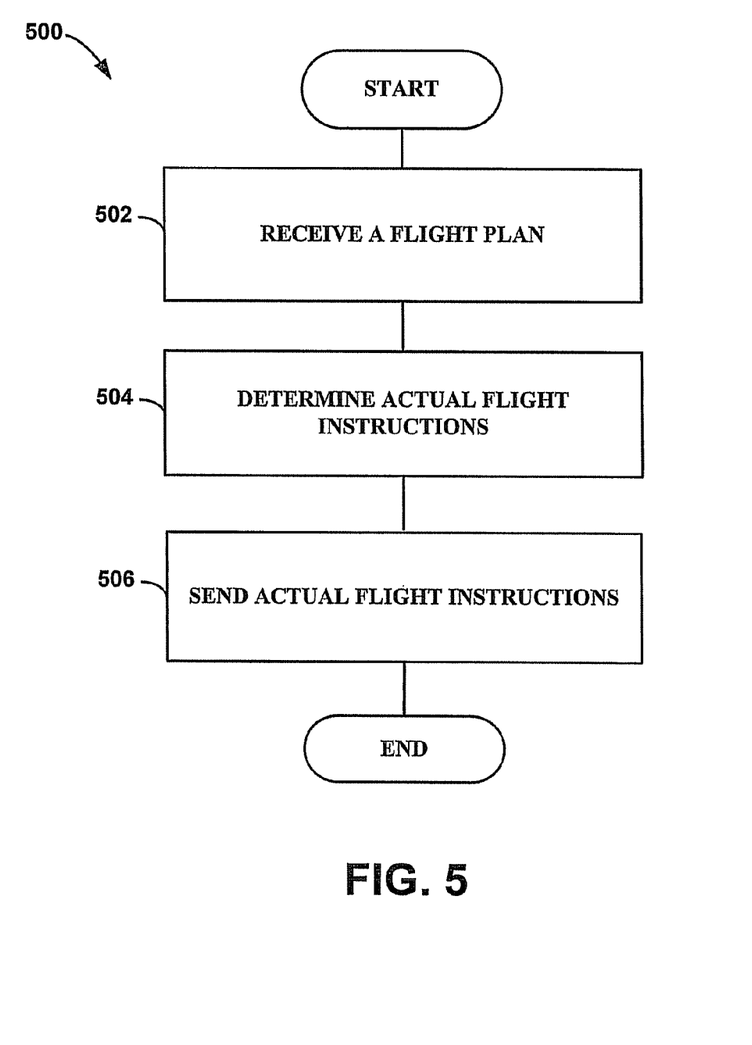
FIG. 5 is a flow chart depicting an example method for controlling the flight of a UAV, such as the UAV depicted in FIG. 1.

FIG. 5 is a flow chart depicting a method 500 for controlling flight of a UAV, such as UAV 100. For the purposes of the description below, the steps are described as being performed by a guidance control system. It should be understood that the guidance system could be located in various locations, such as in processor 302 on the UAV 100 and/or in processor 402 in the ground control station 202. Further, the steps could be performed in conjunction with other entities, such as an external entity in communication with the ground control station 202 and/or the UAV 100.

At block 502, the guidance control system receives a flight plan comprising a plurality of waypoints and a plurality of path segments connecting the plurality of waypoints in an order of execution. Each waypoint may have a corresponding activity to be performed by the UAV at the waypoint. At block 504, the guidance control system determines actual flight instructions for the ducted fan unmanned aerial vehicle based on (i) the received flight plan, (ii) a predetermined set of operating parameters associated with the ducted fan unmanned aerial vehicle, and (iii) an iterative analysis of a plurality of ordered triples. Then, at block 506, the guidance control system sends the flight instructions to at least one processor of the UAV configured to implement one or more portions of the actual flight instructions. These steps of method 500 are described in greater detail in the following subsections.

i. Receive a Flight Plan

As mentioned above, the guidance control system may receive a flight plan that includes a plurality of waypoints and a plurality of path segments connecting the plurality of waypoints in an order of execution. A waypoint may be any point specified by the operator. For instance, a waypoint may be, without limitation, a location, a point of interest, a target, and/or a specific set of coordinates (e.g., latitude and longitude).

Each waypoint has a corresponding activity to be performed by a ducted fan unmanned aerial vehicle at the waypoint. The activities to be performed by the UAV at a waypoint may include one or more of (i) taking off from the waypoint, (ii) flying by the waypoint, (iii) hovering near the waypoint, (iv) flying over the waypoint, or (v) landing at the waypoint. Other activities are possible as well. For example, the UAV may fly in a circumferential path around the waypoint.

Figure 6A:
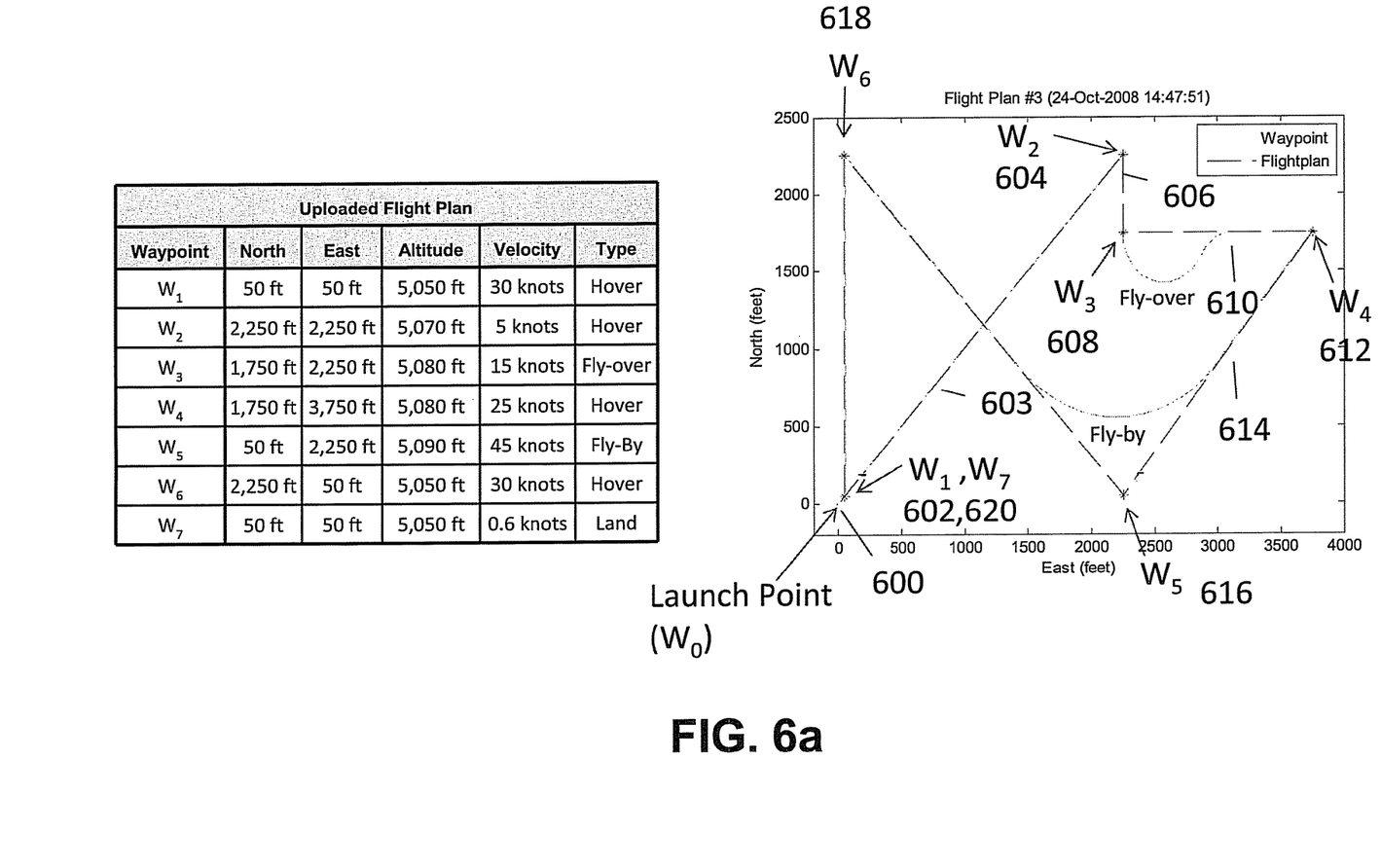
FIG. 6a depicts a received flight plan and FIG. 6b depicts the execution of the uploaded flight plan based on actual flight instructions, according to an example.

An operator may enter this flight plan information at ground station 202. The operator may enter the flight plan at ground station 202 in the form of a simple polyline, where the polyline is a set of line segments that connect a plurality of waypoints in order of their execution. An example of a possible polyline 600 is shown in FIG. 6a. Input unit 406 of ground control station 202 may comprise a touch screen, and the operator may enter polyline 600 on this touch screen. Other ways of entering the flight plan are possible as well. For instance, the operator could type the coordinates of the waypoints in the ground control system and then type in the preferred order of execution.

As an example, with reference to FIG. 6a, the operator may enter four waypoints and an order of execution: a first waypoint 602 ($W_1$), a second waypoint 604 ($W_2$), a third waypoint 608 ($W_3$), and a fourth waypoint 612 ($W_4$). A plurality of path segments 610, 612, 614, and 616 may be defined based on these waypoints and the order of execution. In this example, path segment 603 is the path between $W_1$ and $W_2$, path segment 606 is the path between $W_2$ and $W_3$, path segment 610 is the path between $W_3$ and $W_4$, and path segment 614 is the path between $W_4$ and $W_5$. While this Figure depicts the path segments as being straight lines, it should be understood that the path segments are not so limited. The operator could specify a path that is curved. For example, the operator may specify a curved path in order to avoid certain geographical coordinates, locations, or obstacles.

The operator may then specify the activities to be performed by the UAV at each waypoint. As mentioned above, these activities to be performed by the UAV may include one or more of (i) taking off from the waypoint, (ii) flying by the waypoint, (iii) hovering near the waypoint, (iv) flying over the waypoint, or (v) landing at the waypoint. Further, the operator may enter other flight-plan information (e.g., velocity data) in order to indicate other aspects of the flight plan (e.g., how fast the operator would like the UAV to reach each waypoint). The operator may enter other flight-plan information as well, such as preferred acceleration for portions of the path segments or preferred turn radius for any turn segments in the flight plan.

With reference to FIG. 6a, the operator may enter information that specifies that that the UAV to (i) move from $W_1$ to $W_2$ in at a rate of 30 knots, (ii) move from $W_2$ to $W_3$ at a rate of 5 knots, and move from $W_3$ to $W_4$ at a rate of 15 knots. The operator may also enter information that specifies activity at each waypoint. For example, the operator may enter information that specifies that (i) the UAV hover at $W_1$, (ii) the UAV fly-by $W_5$, (iii) the UAV fly over $W_3$, and (iv) the UAV land at $W_7$.

The operator may enter a flight plan such as the flight plan defined by polyline 600 before the beginning of a flight. Additionally or alternatively, an operator may enter a flight plan during the execution of another flight plan. For example, in accordance with an embodiment, the received flight plan may be an adjusted flight plan, such as an adjustment to an original flight plan. An operator could decide to adjust the flight plan during execution of a mission. The operator may adjust an original flight plan for a variety of reasons, such as adding or deleting waypoints and/or changing activities to be performed at various waypoints of the original flight plan.

Figure 7A:
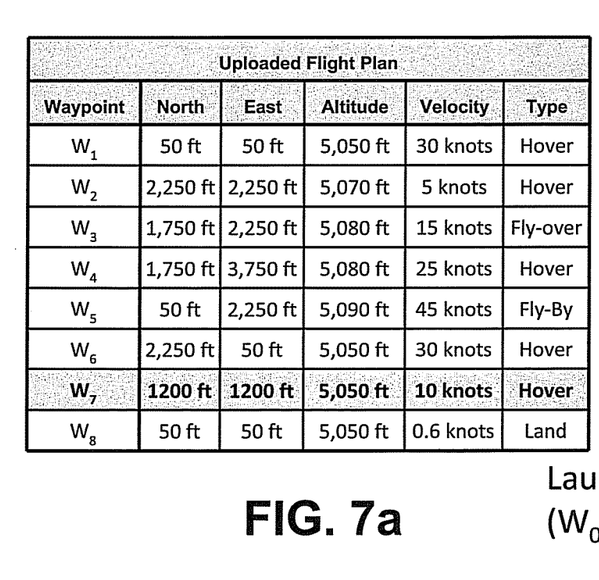
FIG. 7a depicts an adjusted received flight plan and FIG. 7b depicts an adjusted actual flight plan based on adjusted actual flight instructions, according to an example

An example of adjusting a flight plan during flight is provided in FIG. 7a. In this example, when UAV is at $W_2$ 604, the operator may decide to add a new waypoint 702 ($W_7$) to the flight plan (see FIG. 7b). Other examples of adjusting the flight plan are possible as well. For example, the operator may decide to delete $W_2$ and $W_3$ (not shown) while adding two new waypoints (not shown). As another example, the operator may decide while the UAV is flying by a waypoint to instead hover around the waypoint in order to collect more imagery of the waypoint location.

ii. Determine Actual Flight Instructions for the UAV

After receiving a flight plan, the UAV 100 may determine actual flight instructions for the UAV at step 504. The UAV 100 may determine the actual flight instructions based on (i) the received flight plan, (ii) a predetermined set of operating parameters associated with the ducted fan unmanned aerial vehicle, and (iii) an iterative analysis of a plurality of ordered triples. Each ordered triple comprises a most recent prior waypoint and its corresponding waypoint activity, a next waypoint and its corresponding waypoint activity, and a waypoint after the next waypoint and its corresponding waypoint activity.

As described above, the UAV and/or the ground stations may have a guidance system that is operable to determine actual flight instructions. The guidance system may take the received flight plan, perform an iterative analysis of a plurality of ordered triples, and verify that a predetermined set of operating parameters associated with the UAV is not exceeded. Based on this analysis, the guidance system can determine the actual flight instructions for the UAV.

Determining actual flight instructions may include solving for a position and velocity as a function of time for the ducted fan unmanned aerial vehicle based on the received flight plan, the predetermined set of operating parameters, and the iterative analysis of the plurality of ordered triples.

Figure 6B:
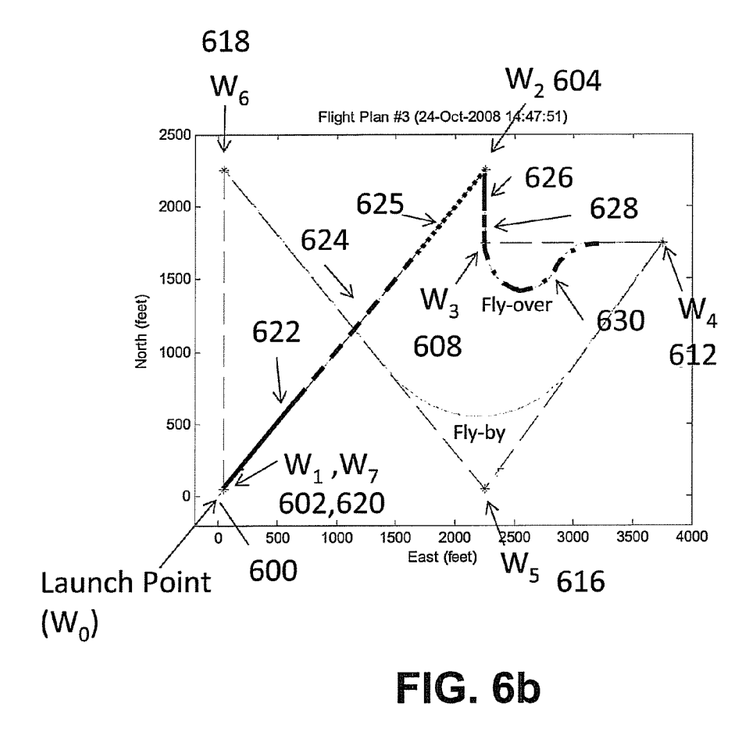

Referring to FIGS. 6a and 6b, the actual flight instructions are calculated based on the polyline, a predetermined set of operating parameters, and a plurality of ordered triples. The flight plan in 6a has a plurality of ordered triples, such as ($W_1$, $W_2$, $W_3$), ($W_2$, $W_3$, $W_4$), ($W_3$, $W_4$, $W_5$).

For each path segment of the flight plan, the guidance system can solve for position and velocity as a function of time based on an ordered triple and predetermined operating parameters. For example, the actual flight instructions for the flight along path segment 603 may be determined based on the received flight plan, the predetermined set of operating parameters, and ordered triple ($W_1$, $W_2$, $W_3$). Further, the actual flight instructions for the flight along path segment 606 may be determined based on the received flight plan, the predetermined set of operating parameters, and ordered triple ($W_1$, $W_2$, $W_3$). Still further, the actual flight instructions for the flight along path segment 610 may be determined based on the received flight plan, the predetermined set of operating parameters, and ordered triple ($W_3$, $W_4$, $W_5$). These calculations may be generally expressed by the following equations:

Flight on path segment 603=$f(W_1, W_2, W_3)$

Flight on path segment 606=$f(W_2, W_3, W_4)$

Flight on path segment 610=$f(W_3, W_4, W_5)$

When solving for each of these path segments, the guidance system may take into account information from the received flight plan (e.g., waypoint activity, velocity data, acceleration data, turn-radius data) and predetermined operating parameters that cannot be exceeded.

The predetermined set of operating parameters includes
1) a maximum acceleration parameter,
2) a maximum deceleration parameter,
3) a maximum velocity parameter, and
4) a minimum turn radius parameter.

For example, the maximum acceleration parameter could be set to one third of the gravitational acceleration constant or the minimum turn radius may be set to 100 ft. When determining the actual flight instructions, the guidance system preferably ensures that the actual flight instructions do not exceed any of the operating parameters even when the received flight plan would have caused the ducted fan unmanned aerial vehicle to exceed one or more of the operating parameters. For example, the operator may have specified that the UAV travel from $W_1$ to $W_2$ at 50 knots. However, the maximum UAV velocity may be 30 knots. Therefore, the actual flight instructions would instruct the UAV to fly at 30 knots and not the 50 knots specified by the operator.

When determining actual flight instructions, the guidance system may break down the path segments into accelerate, cruise, decelerate, turn, and/or hover segments that support the generation of a smooth discontinuity free sequence of incremental positions along the trajectory based on the guidance time increment. Therefore, determining actual flight instructions may include determining, for each path segment of the plurality of path segments connecting the plurality of waypoints, at least one of (i) an acceleration segment, (ii) a cruise segment, (iii) a deceleration segment, (iv) a begin turn segment, and (v) an end turn segment. In order to determine these individual segments, the guidance system may determine velocity and position as a function of time for each segment.

FIG. 6b shows an actual flight path that may result for the determined actual flight instructions. As shown in FIG. 6b, path segment 603 has an acceleration segment 622, a cruise segment 624, a deceleration segment 625. The guidance system preferably calculates these segments based on the received flight plan, the predetermined operating parameters, and the analysis of the ordered triple ($W_1$, $W_2$, $W_3$). Path segment 606 has an acceleration segment 626, a cruise segment 628, and a turn segment 630. The guidance system preferably calculates these segments based on the received flight plan, the predetermined operating parameters, and the analysis of the ordered triple ($W_2$, $W_3$, $W_4$).

In an embodiment, the guidance system may generate an error message when the received flight plan would cause the ducted fan unmanned aerial vehicle to exceed one or more of the operating parameters by a predetermined threshold. For example, the guidance system may generate an error message that alerts the operator that the maximum velocity of 10 knots was exceeded when the operator entered 30 knots.

If path segments of the received flight plan are not feasible, the guidance system can default the UAV flight behaviors to a safe feasible alternative that allows for continued execution of the flight plan. When an error occurs due to, for example, a maximum parameter being exceeded, the guidance system may either (i) automatically correct for the error by determining actual flight instructions that alleviate the error or (ii) prompt the operator to adjust the flight plan in order to alleviate the error.

Figure 8A:
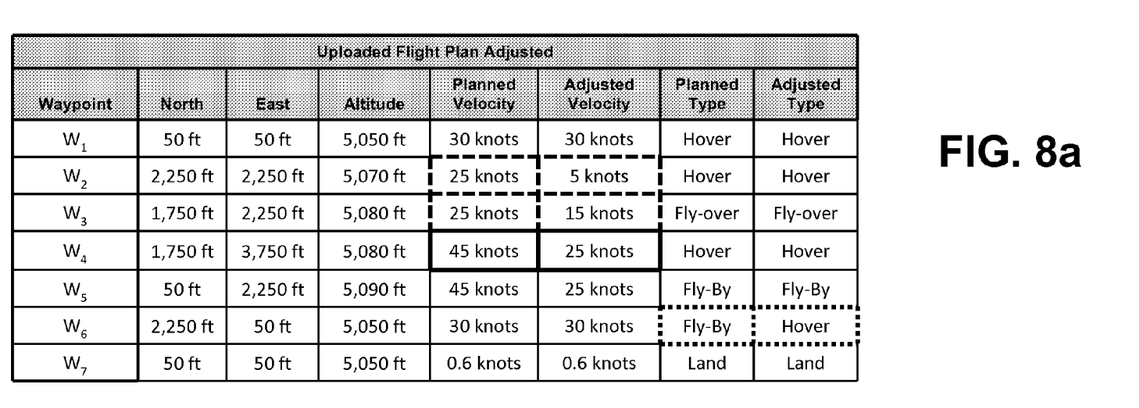
FIG. 8*a* depicts the adjustments made to a flight plan based on applying the flight parameters used by the guidance algorithm and 8*b* depicts the actual flight plan flown based on actual flight instructions, according to the example.
Figure 8B:
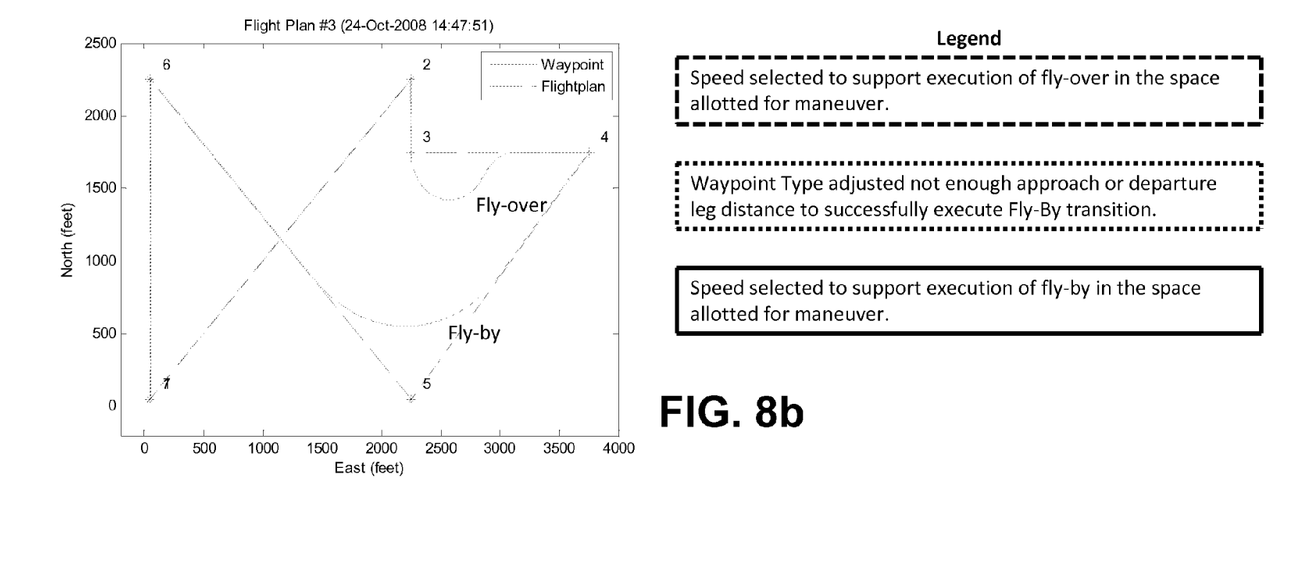

In the preferred embodiment, the guidance system corrects for the error automatically. Further, the guidance system preferably alerts the operator that the guidance system corrected the error. For example, the guidance system could indicate to the user that the 30 knot velocity was reduced to 10 knots. This message may, for example, be displayed on the display unit of the ground control station. As another example, the flight plan could call for a fly over turn where the angle between the legs is 5 degrees or less. Such a flight plan would require a large turn segment taking the vehicle in a large excursion from the intended flight path to execute the turn correctly needlessly burning fuel and delaying the mission. Other examples are shown in FIG. 8. For example, the planned velocity of 25 knots at $W_2$ and $W_3$ is adjusted to 5 knots for $W_2$ and 15 knots for $W_3$ in order to support the execution of a fly-over in the space allotted for the maneuver. As another example, the waypoint type for $W_6$ is adjusted from fly-by to hover because there is not enough approach or departure leg distance to successfully execute a fly-by transition. As yet another example, the planned velocity for $W_4$ is adjusted from 45 knots to 25 knots in order to support execution of fly-by in the space allotted for the maneuver.

In some cases, however, it may not be possible for the guidance system to correct the error while still generally flying the flight plan requested by the operator. For instance, the operator may enter a flight plan where it is not possible to calculate actual flight instructions based on the received flight plan because the geometries and velocities involved in the received flight plan may not be possible. In such a case, the guidance system may send instructions for the UAV to hover while a new plausible flight plan is entered. The ground control station may alert the user that an error has occurred and the UAV will hover until a new flight plan is entered. Alternatively, the guidance system could instruct the UAV to land until new flight instructions are received.

As mentioned above, it may be possible for an operator to alter the flight plan during flight and an example of an altered flight plan is shown in FIG. 7a. In this case, the operator adjusted the flight plan shown in FIG. 6a by adding new waypoint 702 ($W_7$). Once the flight plan is altered, the guidance system calculates new altered flight instructions. The guidance system may determine actual flight instructions by solving for the flight for the new path segments as discussed above. The actual flight instructions may be based on the following general equations:

Flight on path segment $710 = f(W_5, W_6, W_7)$

Flight on path segment $712 = f(W_6, W_7, W_8)$

Figure 7B:
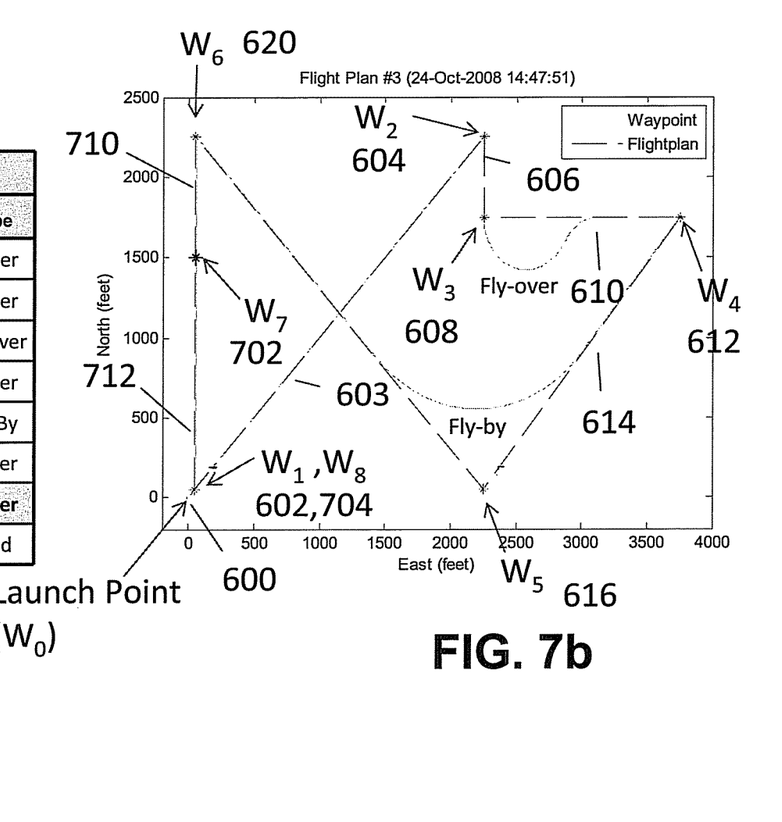

FIG. 7b depicts an actual flight path based on the actual flight instructions for the flight on these path segments.

When the flight plan is altered during execution of the flight, it is not possible to calculate the entire set of actual flight instructions prior to take-off. Therefore, some of the actual flight instructions are determined while the UAV is in flight. Therefore, it should be understood that, in some embodiments, determining actual flight instructions may comprise determining the flight instructions in multiple sets. For instance, determining actual flight instructions may include determining first, second, and third sets of actual flight instructions. Determining the first set may comprise determining instructions based on a first ordered triple of the plurality, determining the second set may comprise determining instructions comprises based on a second ordered triple of the plurality, and determining the third set may comprise determining instructions comprises based on a third ordered triple of the plurality.

The guidance system may determine these different sets at the same time or at different times. For example, the second set of flight instructions may be determined while the UAV is executing the first set of flight instructions and the third set of flight instructions may be determined while the UAV is executing the second set of flight instructions. For instance, the flight instructions for flying on path segment 712 may be determined while the UAV is flying on path segment 710, and the flight instructions for flying on path segment 714 may be determined while the UAV is flying on path segment 712. This capability allows for an operator to adjust the flight plan at will, while still allowing the UAV to fly along a smooth and discontinuity-free trajectory.

As mentioned above, determining the actual flight is based in part on an iterative analysis of the plurality of ordered triples, where an ordered triple comprises a plurality of waypoints and each waypoint's corresponding waypoint activity. It should be understood that determining actual flight instructions based on a waypoint and its corresponding activity preferably takes into account the position of the UAV at or near the waypoint and its velocity at or near the waypoint. For example, if the activity at the waypoint is hovering, the velocity may be 0 knots and the position of the UAV may be at the waypoint. However, if the activity is a fly-by, the velocity at the waypoint may be 5 knots and the position of the UAV may be 25 meters beyond the waypoint. In this regard, determining actual flight instructions based on a waypoint and its corresponding waypoint activity should be understood to encompass, for example, taking into account position and velocity data for the UAV at X distance (e.g., 25 meters) from the waypoint or X seconds (e.g., 10 seconds) after the UAV passes or should pass the waypoint.

iii. Send Actual Flight Instructions to the UAV

Figure 9:
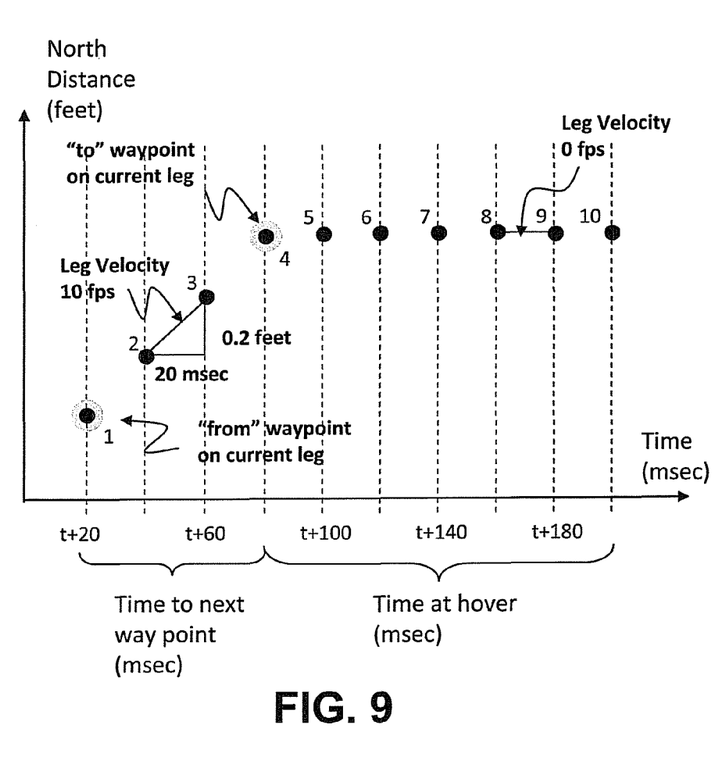

After the actual flight instructions are determined, at step 506, the guidance system may send the actual flight instructions to at least one processor of the UAV configured to implement one or more portions of the actual flight instructions. The actual flight instructions may comprise a series of position commands for the positions along the flight trajectory. In an embodiment, a guidance algorithm running on the guidance system may run at a fixed rate and may generate position commands at a fixed rate. For example, FIG. 9 is an example of position commands transmitted to a flight control system where each command position is updated at a rate the guidance algorithm is evaluated at. In this example, position commands are generated at a rate of every 20 milliseconds (ms). This example depicts a series of position commands during a flight segment where the UAV is moving from a prior waypoint to a waypoint on a current leg where the waypoint activity is to hover. Further, this figure depicts position commands plotted in north distance (feet) against time (ms). It should be understood that the position commands could be plotted in other directions against time, such as east, north, and altitude position.

Specifically, FIG. 9 depicts ten position commands (position commands 1-10), each separated by 20 ms. As the UAV moves toward the waypoint, position commands 1-4 command the UAV to move north. As show, the position commands 2 and 3 direct the UAV to move at a velocity of 10 feet per second (fps) in order to move 0.2 feet north in 20 ms. As seen in the Figure, during the hovering activity at the waypoint, the north distance position commands remains constant (i.e., position commands 4-10). It should be understood that the guidance algorithm may be evaluated a rate less than or greater than 20 ms. For example, the guidance algorithm may be evaluated at 5 ms, 10 ms, 30 ms, or 100 ms. Other examples are possible as well.

A processor in the avionics system 308 may be configured to implement the actual flight instructions. In a preferred embodiment, the actual flight instructions are sent from a central processor on the UAV to one or more other processors on the UAV, such as the processor in the avionics system 308. Alternatively, the central processor could send the actual flight instructions to another portion of the central processor that is configured to implement the actual flight instructions.

In an alternative embodiment, where the ground control station determines the actual flight instructions, the actual flight instructions are sent from the ground control station associated with the UAV to a processor on the UAV configured to implement one or more portions of the actual flight instructions. In an embodiment, the ground control station may determine the actual flight instructions based on the incremental position commands described above, and the ground control station may transmit these incremental position commands to the UAV via a data link.

Sending the actual flight instruction may comprise sending the actual flight instructions in a complete set. This may be done, for example, when the flight instructions are calculated at the beginning of the flight. Alternatively, sending the actual flight instruction may comprise sending the actual flight instructions in a first set and a second set (or additional sets). This may be done, for example, when determining actual flight instructions includes determining a first set and a second set of actual flight instructions at different times during the flight. This may occur, for example, when an operator alters a flight plan during the execution of the flight.

Operating the flight of a UAV in accordance with embodiments offers example advantages. For example, a method, ground station, or UAV in accordance with embodiments provides a simplified UAV-operation interface that minimizes training and operator workload necessary to fly a UAV. The simplified interface may support an intuitive use of a UAV without having to understand the flight performance of the vehicle or have extensive experience in flying similar vehicles. For instance, an operator may need less that a week of experience and training to adequately control a UAV equipped with a guidance system in accordance with embodiments. Rather, the operator need only enter a flight plan that comprises a series of waypoints and a series of activities occurring at those waypoints. A complex flight based on a simple flight plan can beneficially be flown in a fault tolerant manner, without forcing the operator to know or understand the intricacies of controlling the flight of the UAV.

As mentioned above, the method described above may primarily be performed at either the ground station or at the UAV. Furthermore, UAVs may have different principles, and therefore the actual flight instructions may depend on what type of UAV. Accordingly, either the UAV or the ground station must have access to the operating parameters of the type of UAV that an operator is controlling. In a preferred embodiment, the UAV carries out determining the actual flight instructions rather than the ground station. Since each UAV would perform determine the actual flight instructions for its own operation, a single ground station would then be capable of controlling a variety of different UAVs and the ground station would not need to be equipped with hardware or software that knows or distinguishes the different operating parameters of multiple types of UAVs. The ground station would simply need to be capable of receiving a flight plan and transmitting the flight plan to the UAV. This simplicity for the ground station may have numerous benefits, such as simplifying the operation of the ground control station and lowering the costs associated with manufacturing and/or maintaining an operable ground control station.

Exemplary embodiments of the present invention have been described above. In addition, those skilled in the art will understand that changes and modifications may be made to these exemplary embodiments without departing from the true scope and spirit of the invention, which is defined by the claims.

We claim:

1. A method comprising:
   receiving a flight plan comprising a plurality of waypoints, a plurality of path segments connecting the plurality of waypoints in an order of execution, and, for each waypoint, information indicating a corresponding activity to be performed by an unmanned aerial vehicle at the waypoint;
   determining actual flight instructions for controlling flight of the unmanned aerial vehicle between the plurality of waypoints based on the received flight plan, a predetermined set of operating parameters associated with the unmanned aerial vehicle, and an iterative analysis of a plurality of ordered triples, wherein each ordered triple comprises a most recent prior waypoint and its corresponding waypoint activity, a next waypoint and its corresponding waypoint activity, and a waypoint after the next waypoint and its corresponding waypoint activity; and
   sending the actual flight instructions to at least one processor of the unmanned aerial vehicle configured to implement one or more portions of the actual flight instructions.

2. The method of claim 1, wherein the activities to be performed by the unmanned aerial vehicle at a waypoint comprise one or more of taking off from the waypoint, flying by the waypoint, hovering near the waypoint, flying over the waypoint, or landing at the waypoint.

3. The method of claim 1, wherein determining actual flight instructions comprises determining, for each path segment of the plurality of path segments connecting the plurality of waypoints, at least one of an acceleration segment, a cruise segment, a deceleration segment, a begin turn segment, and an end turn segment.

4. The method of claim 1, wherein the predetermined set of operating parameters associated with the unmanned aerial vehicle comprises a maximum acceleration parameter, a maximum deceleration parameter, a maximum velocity parameter, and a minimum turn radius parameter, and wherein the actual flight instructions do not exceed any of the operating parameters.

5. The method of claim 1, wherein determining actual flight instructions comprises solving for a position and velocity as a function of time for the unmanned aerial vehicle based on the received flight plan, the predetermined set of operating parameters, and the iterative analysis of the plurality of ordered triples.

6. The method of claim 1, further comprising generating an error message when the received flight plan would cause the unmanned aerial vehicle to exceed one or more of the operating parameters by a predetermined threshold.

7. The method of claim 1, wherein sending the actual flight instructions comprises sending the actual flight instructions from a ground control station associated with the unmanned aerial vehicle to a processor on the unmanned aerial vehicle.

8. The method of claim 1, wherein sending the actual flight instructions comprises sending the actual flight instructions from a central processor on the unmanned aerial vehicle to one or more other processors on the unmanned aerial vehicle.

9. The method of claim 1, further comprising:
   receiving an adjusted flight plan, wherein the adjusted flight plan comprises a plurality of waypoints and a plurality of path segments connecting the plurality of waypoints in an order of execution, and, for each waypoint, information indicating corresponding activity to be performed by the unmanned aerial vehicle at the waypoint;
   determining adjusted actual flight instructions for the unmanned aerial vehicle based on the received adjusted flight plan, the predetermined set of operating parameters associated with the unmanned aerial vehicle, and a second iterative analysis of a second plurality of ordered triples, wherein each ordered triple of the second plurality of ordered triples comprises a most recent prior waypoint and its corresponding waypoint activity, a next waypoint and its corresponding waypoint activity, and a waypoint after the next waypoint and its corresponding waypoint activity; and
   sending the adjusted actual flight instructions to at least one processor of the unmanned aerial vehicle configured to implement one or more portions of the adjusted actual flight instructions.

10. The method of claim 1, wherein sending the actual flight instructions to at least one processor of the unmanned aerial vehicle comprises sending a first set of actual flight instructions to at least one processor of the unmanned aerial vehicle and a second set of actual flight instructions to the at least one processor of the unmanned aerial vehicle.

11. A system comprising:
    an unmanned aerial vehicle; and
    a processor configured to:
      receive a flight plan comprising a plurality of waypoints and a plurality of path segments connecting the plurality of waypoints in an order of execution, and information about a corresponding activity to be performed by the unmanned aerial vehicle at each of the waypoints; and
      determine actual flight instructions for controlling flight of the unmanned aerial vehicle between the plurality of waypoints based on the received flight plan, a predetermined set of operating parameters associated with the unmanned aerial vehicle, and an iterative analysis of a plurality of ordered triples, wherein each ordered triple comprises a most recent prior waypoint and its corresponding waypoint activity, a next waypoint and its corresponding waypoint activity, and a waypoint after the next waypoint and its corresponding waypoint activity;

wherein the unmanned aerial vehicle configured to execute the actual flight instructions.

12. The system of claim 11, wherein the processor is configured to determine actual flight instructions by at least determining, for each path segment of the plurality of path segments connecting the plurality of waypoints, at least one of an acceleration segment, a cruise segment, a deceleration segment, a begin turn segment, and an end turn segment.

13. The system of claim 11, wherein the predetermined set of associated operating parameters comprises a maximum acceleration parameter, a maximum deceleration parameter, a maximum velocity parameter, and a minimum turn radius parameter, and wherein the actual flight instructions determined by the processor do not exceed any of the operating parameters.

14. The system of claim 11, wherein the processor is configured to determine actual flight instructions by at least solving for a position and velocity as a function of time based on the received flight plan, the predetermined set of operating parameters, and the iterative analysis of the plurality of ordered triples.

15. A ground control station for an unmanned aerial vehicle, the ground control station comprising:
   a transceiver unit; and
   a processor configured to:
      receive a flight plan comprising a plurality of waypoints and a plurality of path segments connecting the plurality of waypoints in an order of execution, and information about a corresponding activity to be performed by the unmanned aerial vehicle at each of the waypoints;
      determine actual flight instructions for controlling flight of the unmanned aerial vehicle between the plurality of waypoints based on the received flight plan, a predetermined set of operating parameters associated with the unmanned aerial vehicle, and an iterative analysis of a plurality of ordered triples, wherein each ordered triple comprises a most recent prior waypoint and its corresponding waypoint activity, a next waypoint and its corresponding waypoint activity, and a waypoint after the next waypoint and its corresponding waypoint activity; and
      initiate transmission of the actual flight instructions to the unmanned aerial vehicle via the transceiver unit.

16. The ground control station of claim 15, wherein the processor is configured to determine actual flight instructions by at least determining, for each path segment of the plurality of path segments connecting the plurality of waypoints, at least one of an acceleration segment, a cruise segment, a deceleration segment, a begin turn segment, and an end turn segment.

17. The ground control station of claim 15, wherein the predetermined set of associated operating parameters comprises a maximum acceleration parameter, a maximum deceleration parameter, a maximum velocity parameter, and a minimum turn radius parameter, and wherein the actual flight instructions determined by the processor do not exceed any of the operating parameters.

18. The ground control station of claim 15, wherein the processor is configured to determine actual flight instructions by at least solving for a position and velocity as a function of time based on the received flight plan, the predetermined set of operating parameters, and the iterative analysis of the plurality of ordered triples.

19. The method of claim 1, wherein each ordered triple corresponds to at least one path segment of the plurality of path segments.

20. The system of claim 11, wherein each ordered triple corresponds to at least one path segment of the plurality of path segments.

* * * * *